Aug. 17, 1965     H. L. HARDY ETAL     3,201,677
TEMPERATURE COMPENSATED VOLTAGE CONVERTER
Filed Jan. 3, 1961     2 Sheets-Sheet 1

*INVENTOR.*
HERBERT L. HARDY
WILLIAM J. MAHONEY
BY
*Murray Schaffer*
ATTORNEY

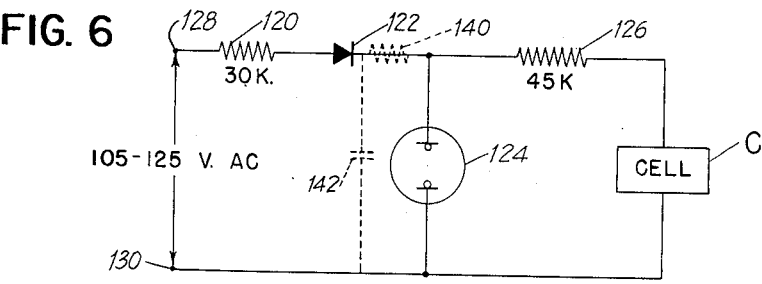
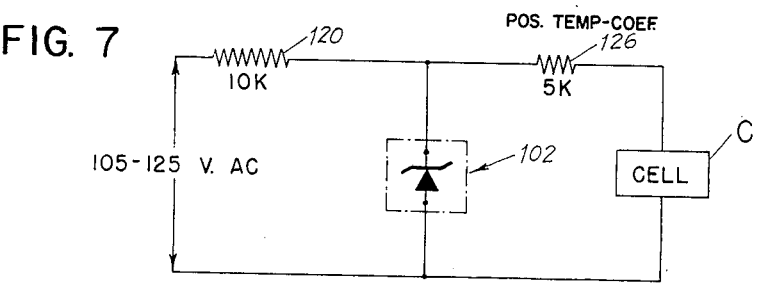
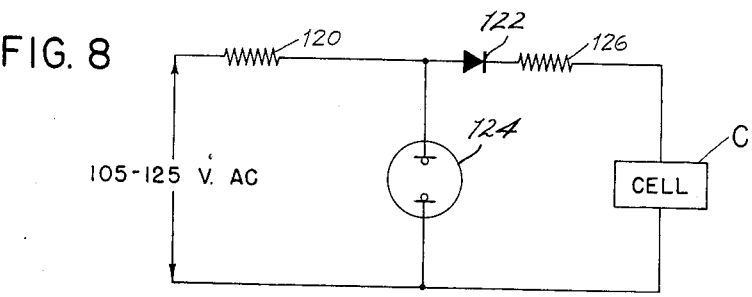
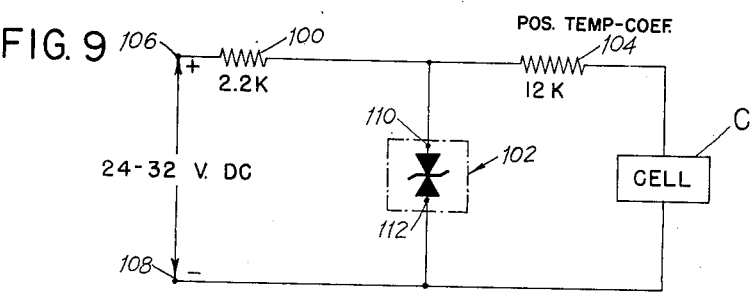
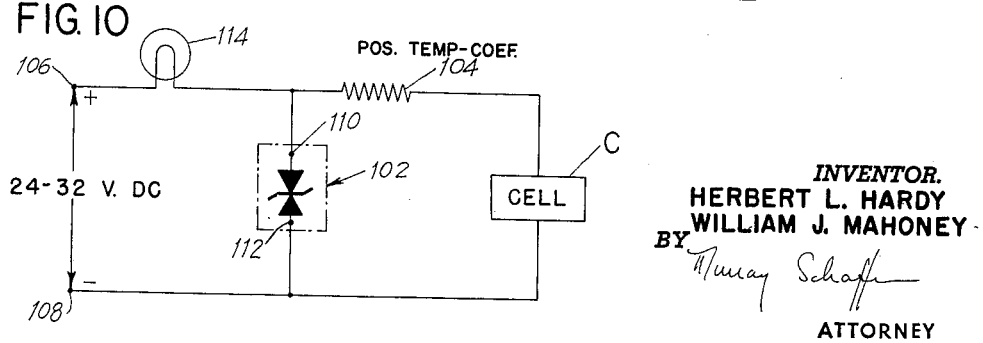

United States Patent Office 3,201,677
Patented Aug. 17, 1965

3,201,677
TEMPERATURE COMPENSATED VOLTAGE CONVERTER
Herbert L. Hardy, Monroe, and William J. Mahoney, Darien, Conn., assignors to American Machine & Foundry Company, a corporation of New Jersey
Filed Jan. 3, 1961, Ser. No. 80,345
2 Claims. (Cl. 321—16)

The present invention relates in general to an elapsed time indicator and in particular to an electrochemical device for indicating the cumulative passage of a given period or series of periods during which mechanical or electrical apparatus has been in operation.

It is important, if not often essential, to accurately determine the cumulative length of time during which certain machines have been in operation in order to avoid their continued use beyond their safe limit or endurance. By way of explanation, and not of limitation since numerous other examples are apparent, reference is made to the operation of an airplane. It is essential that the total number of operating hours of its various parts be accurately calculated so that the airplane will receive its numerous periodic performance checks at the proper time. The military air forces and commercial airlines have found that they could not rely solely upon the "Log Book" records of their pilots for very accurate accounts of the actual time of operation of the aircraft since the pilot could not keep track of the many periods the craft was in operation, other than the actual flight, such as warm-up periods, waiting time before and after take off and test runs. It sooms obvious that what would be required is a highly accurate indicator, coupled directly to the engine and responsive only to its operation, to eliminate any source of human error. No doubt the reader is well aware of similar situations in other industries and in connection with the operation of other apparata.

Digital time computers and indicators employing clock mechanisms and electric motors have been known for some time, as have various electrochemical indicators. However, the digital indicators are relatively expensive, large and extremely delicate. The electrochemical indicators have been notoriously weak, inaccurate, and unable to meet the rather strict and rigid requirements necessary for use on such apparata as military and commercial aircraft. For example, such requirements might include that the indicator accurately compute time intervals within an error of ±5% of total elapsed time, operate without defect or interruption in temperature conditions varying from —35° C. to +85° C. and line voltage variation from 105–125 v. A.C., 50 to 2400 cycles per second, 24–32 v. D.C., withstand extreme shock, vibration and pressure, while at the same time being of miniature size, in order to conserve space, and rather inexpensive. Few, if any, of the heretofore known indicators meet all of these requirements. One of the important reasons for the failure of previously known electromechanical elapsed time indicators to meet the exacting standards noted, is the fact that they all employ a solid metallic electroplating process.

It is therefore the prime object of this invention to provide a rugged, inexpensive, highly reliable, but miniature elapsed time indicator.

It is also an object of the present invention to provide a simple, inexpensive device capable of accurately indicating and recording the accrual of time periods during which mechanical, electrical, and/or other devices and apparata are in operation.

It is a further object of the present invention to provide such an indicating unit that will indicate the elapse of time through use of an electrolytic cell through which a constant current is made to flow, said curren being applied during the period and/or periods in which the mechanical or electrical apparatus is in operation.

It is still a further object of the present invention to provide a miniature elapsed time indicator capable of installation in airplanes, space vehicles or in similar apparatus where size and weight are critical.

Another object of the present invention is to provide a miniature elapsed time indicator capable of accurate operation within extreme ranges of temperature, vibration, pressure and shock.

It is another object to provide an indicator of the type described which is inexpensive and simple to make in order that it may be readily employed and discarded after it has served its function.

The foregoing and other objects and advantages will be apparent from the following description taken in conjunction with the accompanying drawings in which:

FIGS. 6, 7, 8 are circuit diagrams of the constant current generator powered by A.C. supply;

FIGS. 9, 10 are circuit diagrams of the constant current generator powered by D.C. supply.

Figure 1:
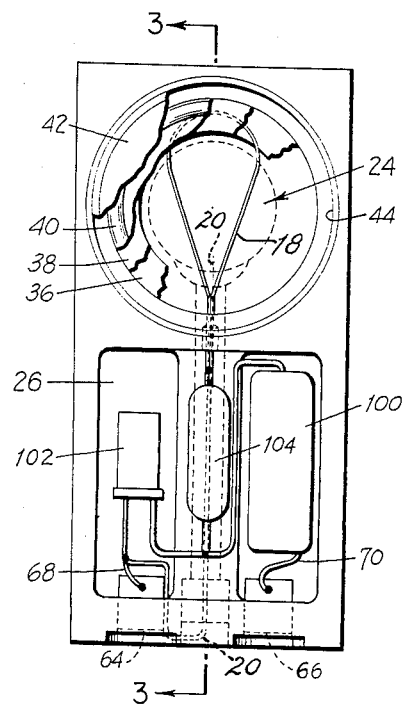
FIG. 1 is a rear elevational view partially broken away of the device of the present invention.
Figure 2:
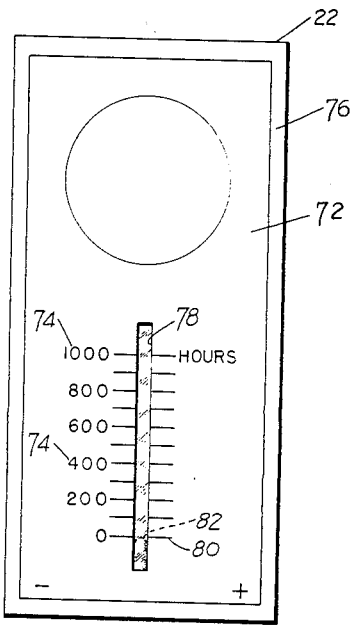
FIG. 2 is a front elevational view showing the face of the present device.

The invention shown in FIGS. 1–5 is based in principle on the Mercury Coulometer, a liquid electrolytic system founded on Faraday's well-known law of electrolysis. The device comprises essentially an anode position 10 containing a major quantity of mercury 12 and a separate cathode position 14 all of which is immersed in a suitable electrolyte solution 16. In accordance with Faraday's law, the mass of mercury 12 involved in reaction at the anode and cathode electrodes 18 and 20 respectively, is directly proportional to the quantity of electricity passed through the solution. This can be expressed generally by the following equation:

$$m = \frac{It}{96,500} \times \frac{w}{x}$$

Where:
$I$=current in amperes
$t$=time in seconds
$w$=atomic weight
$z$=valence number
$m$=mass mercury in grams When a current is passed through the electrolytic solution, a migration of mercury ions is started which collects on the cathode electrode. The chemical reaction can be expressed as follows:

Anode=
$$Hg\,(m) \longrightarrow Hg^{++} + 2e^-$$
$$Hg^{++} + 4I^- \longrightarrow HgI_4^=$$
Cathode=
$$HgI_4^= + 2e^- \longrightarrow Hg\,(m) + 4I^-$$

When a constant current is passed through the system, the amount of mercury that will be deposited in the cathode chamber is proportional to the time during which the current is applied and it may be readily calculated and measured to indicate exactly the length of time passage. Should the constant current be derived from a machine or other apparatus when in operation, then the indication made by the coulometer would be directly proportional to the time of operation of said machine or apparatus. The advantages in the use of a mercury coulometer system are, its precise readability, due to the fact the mercury coalesces into a homogeneous body free of voids, projections and irregularities, manifested in an easily readable meniscus and its increased visibility due to the reflectivity of mercury. The present invention combines a number of new elements, means and structural details to obtain, heretofore, unknown, unexpected and superior results.

The structure of the present invention comprises a substantially solid rectangular parallelepiped housing 22 which may be formed of glass, plastic or other suitable material. Consideration, in the choice of material, need only be given to the use to which the indicator will be put, for the material's ruggedness and to the electrolyte element for its chemical stability. It has been found that for the embodiment shown a very rugged and strong housing may be made of lucite or plexiglass which, in addition, are also chemically inert to the most electrolytic solutions. Other sources of suitable materials found were PL-11 by J. T. Baker Chemical Co. and "Merlon" by Mobay Products Co.

The solid housing 22 is divided into two major chambers or cavities. The upper cavity 24 is to provide space for the electrolytic cell and the lower cavity 26 is to provide space for the necessary electronic circuitry to generate a constant current source. While the complete electronic circuitry will be described in greater detail later, it is noted at the present time, that all of it is contained solely within the space provided by the lower cavity 26.

In addition to the two cavities 24 and 26, the housing 22 is formed with an elongated bore 28 connected to and depending from the upper cavity 24. The bore 28 is of substantially uniform inner diameter, having only a shallow groove or key-way 30 of approximately 0.02 inches wide running lengthwise from top to bottom of the bore 28. The bore 28 forms a reading tube in which the mercury 12 may be accumulated during operation of the indicator. The groove or key-way 30 is provided to facilitate the accumulation of the mercury 12 in the reading tube 28 by permitting the escape of electrolyte solution 16 from the tube on the descent of a plug or small amount of mercury. Otherwise, the mecury 12 entering the tube 28 could be retarded by the liquid pressure or piston action of the solution 16 trapped in an elongated tube such as tube 28 is. It will be observed that the width (0.02 inches) of the groove 30 is too small to allow entry of any substantial amount of mercury therein.

It will be interesting to note that the overall dimensions of the body 22 of this device are approximately .53 x 1.06 x 2.18 inches. Mention is made of the size of the device to enable the reader to better vizualize its structure and the significant and critical details.

The cell structure of the upper cavity 24 is formed by dividing this cavity roughly in two sections by a microporous separator 32 making thereof the anode chamber 10 and the cathode chamber 14 which also includes the reading tube 28. The microporous filter element 32 is held in place between a shoulder 34 and a pair of rubber sealing rings 36 and 38 and an O-ring diaphragm 40. The diaphragm 40 is held in place against a cap 42 slip fit into opening 44 of the housing 22 which is formed to make cavity 24. The separator 32 may be made of suitable filter material capable of permitting the flow of the electrolyte solution 16 but not of the mercury 12, except when in ionic form. Suitable separators used for the embodiment shown may be made of a P.V.C. type 2010 5:1 N/P microporous plastic, manufactured by ESB-Reeves Corp., or other similar materials. The filter is preferably .050 inch thick with 80% total porosity and a pore size in the 8–12 micron range. Filters such as the Teflon coated glass fabric manufactured under the trademark "AMFAB" by American Machine & Foundry Company have also been used with success. The sealing rings 36 and 38 and the O-ring diaphragm 40 may be made from any suitable rubbery material such as DuPont's Fairprene silicone rubber.

The anode and cathode electrodes 18 and 20 are introduced into the anode and cathode chambers 10 and 14 respectively, completing the internal cell structure. The anode electrode 18 is placed through the body 22 from the lower electronic cavity 26 at point 46 and is looped to present greater surface contact with the mercury puddle 12 contained in the anode chamber 10 at all positions in which the indicator may be placed. The anode 18 is sandwiched between the two rubber sealing rings 36 and 38. The cathode electrode 20, on the other hand, is placed lengthwise in the reading tube 28 through a plug 48 which is cemented at the bottom of the tube 28. The cathode electrode 20 extends upwardly through the reading tube 28 into the cathode chamber 14, outwardly into the electronic cavity 26 through body 22 at 50 adjacent to the plug 48. The electrodes 18 and 20 are respectively cemented both to the body 22 and plug 48 for rigidity and the prevention of leakage of the electrolytic solution 16. While the electrodes 18 and 20 may be made of any non-corrosive metal wire material, a suitable material that has been employed has been a .010 inch diameter annealed platinum wire of reference grade. Platinum clad wire with a nichrome core has also been found satisfactory as has a molybdenum wire.

A number of important and advantageous results are obtained by placing the cathode electrode 20 in the position shown. They are: (1) an undesirable accumulation of mercury 12 on the cathode wire 20 outside the reading tube 28 can thus be avoided; (2) no tapping, shaking or vibration is required to get the mercury 12 into the reading tube 28; and (3) the wire electrode 20 facilitates the descent of the mercury 12 in the reading tube since the mercury will break on the wire and slide down it easily.

An alternate method of mounting the cathode wire may also be employed. As an alternate, the cathode wire may be mounted in a manner similar to that of the anode wire; that is, through the body 22 directly into the cathode chamber 14 and in the form of a loop. This method has the advantage of achieving slightly lower low cell resistance when in operation, but may cause a small accumulation of mercury on the wire during operation which needs to be shaken off.

The anode and cathode chambers 10 and 14 respectively, and the reading tube 28, are filled with a quantity of electrolytic solution 16 and mercury 12. The anode cavity 10 containing substantially all mercury with some small amount of solution and the cathode cavity 14 and reading tube 28 contain substantially all solution with a small amount of mercury.

It had been observed that the known electrolyte solutions of mercuric iodide with other elements were unsuitable for operation at the extremes of temperature to which the present devices were to be put. Specifically, the known solutions would freeze, rendering the devices inoperative, at substantially higher temperatures than the objective of −35° C. and that at any temperature below −10° C. the solutions were liable to become unstable, causing considerable error in the operation of the device. It has been found, however, that an extremely stable solution, capable of remaining liquid at extremely low temperatures and capable of performing without error, can be made by the inclusion of lithium iodide.

Particularly, solutions comprising about 50–60% lithium iodide, and about 12–18% mercuric iodide diluted with about 22–38% distilled water, worked and functioned extremely well. For example: (1) a solution comprising 7.5 grams lithium iodide tri-hydrate and 2.7 grams mercuric iodide diluted to 10 cc. with distilled water, did not form any ice crystals above −35° C. and did not freeze until subjected to a lower temperature; (2) a solution comprising 9 grams lithium iodide tri-hydrate and 2.7 grams mercuric iodide diluted to 10 cc. with distilled water, did not freeze above −57° C.; and (3) a solution comprising 10 grams of lithium iodide tri-hydrate and 2.7 grams mercuric iodide diluted to 10 cc. with distilled water, did not freeze above −79° C. Solutions containing other proportions of lithium iodide worked quite well, although the greatest efficiency was found within the described ranges. All of the solutions prepared, including the example, were tested at considerable length within the temperature ranges of −35° C. and 85° C. and were found to perform satisfactorily without error.

In the present apparatus, the third example of a solution containing 10 grams lithium iodide and 2.7 grams mercuric iodide diluted to 10 cc. with water is preferred since its freezing point is well below the critical limit to which the indicator will be put. Further, in the present device, the pH of the solution has been adjusted to 7 with hydriodic acid, although not absolutely necessary.

The mercury used in the indicator is preferably of the instrument grade or better to insure a purity sufficient for quick coalescence in the reading tube.

In order to hermetically seal the components of the electrolytic cell from leakage externally of the body as well as internally between the elements, the cap 42 is formed with an annular flange 52 having in its face an annular groove 54 adapted to receive the O-ring diaphragm 40. As the cap 42 is fit into opening 44, it causes the O-ring diaphragm 40 to seat properly and securely over the sealing rings 36 and 38 which are in turn pressed or force fit together against filter separator 32 and shoulder 34. The cap 42 is also provided with an annular champhered edge 56 on its outside face so that as it is fitted into opening 44, there is provided an annular groove that may be filled with a suitable sealing material such as an epoxy resin in order to secure the cap 42 permanently in place.

A chamber 58 formed between the inner face of the cap 42 and the O-ring diaphragm 40 is provided to compensate for or overcome the effect of the difference in coefficients of expansion between the electrolytic solution 16 and the mercury 12 used in the cell and the body 22 itself. During assembly, the chamber 58 is evacuated to permit the diaphragm 40 to expand or contract as a result of the changes in thermal condition of the solution 16 and mercury 12.

Figure 3:
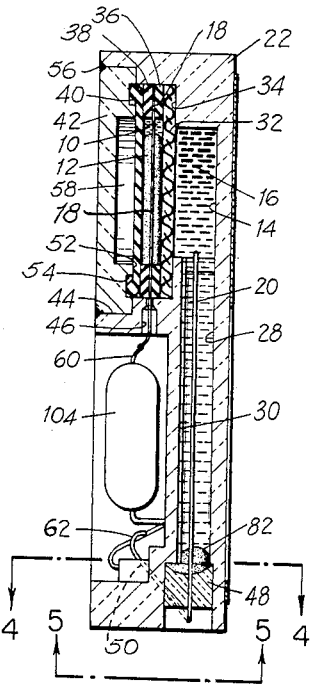
FIG. 3 is a cross sectional view of the device taken along lines 3—3 of FIG. 1.

To complete the structure of the indicator, the electronic circuitry, shown generally in FIGS. 1 and 3, is "potted" in some phenolic or epoxy resinous material directly within the cavity after suitable connection 60 and 62 is made between its elements, the anode and cathode electrodes respectively. Brass plugs or screw binding posts 64 and 66 are provided at the bottom of the body 22 as input terminals for connection to leads 68 and 70, respectively, to the electronic circuit. Other optional methods, such as "potted" leads, extending from the cavity, may be employed.

A nameplate 72 or other suitable device carrying calibrated indicia 74 is secured over the front face 76 of the body 22. The nameplate 72 has a slotted portion 78 which fits over the reading tube 28 so that the height of the mercury column within is clearly visible. The indicia 74 is calibrated in equal portions to divide the maximum effective operating time of the indicator for accurate reading at any time. The index 74 is properly placed, initially, by placing the zero hour marker at the meniscus 82 of the small amount of mercury 12 initially lodged in the reading tube 28. The passage of time can then be obtained by reading the position of the rising meniscus 82 in the tube. For easy and lasting construction, the nameplate 72 can be made of anodized aluminum with a quick adhesive backing.

It will be seen that the embodiment shown is indexed to read the accumulation of 1000 hours. It has been calculated that in a structure of this embodiment, the mercury 12 will accumulate in the reading tube 28 at a rate of .04 inch per fifty hours with the passage of 0.5 milliampere ±3% for a maximum period of operation of 1200 hours. It has also been found that the resistance between the electrodes of the cell varies between 200 ohms at −35° C. and 10 ohms at +85° C. This variance of internal resistance does not exceed ±1% of the constant current impedance. It has also been found that in operation the error of this device is less than ±1% of the actual passage of time. Other periods of time from 100 to 10,000 or more hours of operation can be achieved by simply varying the tube diameter and current proportionally.

In general use, the indicator will be made to receive an electrical supply from either of two sources; a line current of either 24–32 v. D.C. or 105–125 v. A.C. Accordingly, it is necessary to provide optional circuitry which can convert the variable line current into the constant current of about 0.5 ma. ±1% necessary to operate the indicator. For convenience, two separate devices have been made, one for A.C. supply and one for D.C. supply, both capable of meeting the operational requirements while still being small enough to be located and potted within the cavity 26 of the body 22.

In FIG. 9, there is shown suitable means for use with a D.C. supply of 24–32 v. For amplification, the structure of this circuit is shown in FIG. 1 so that a complete understanding of the device may be had. This circuitry comprises a 1 watt ±5%, 2.2K ohm composition resistor; a double anode 6 volt 10 ma. voltage regulating diode 102; and a 1 watt ±1% wire wound 12K ohm precision resistor 104 having a positive temperature coefficient of a selected value to compensate for the temperature coefficient of the double anode voltage regulating diode 102. The voltage regulator 102 may be a zener diode of the RT 6 type manufactured by the Hoffman Electronics Company, Evanston, Illinois.

The composition resistor 100 is used for biasing the voltage regulator 102 and fixing its operating point at 6 v. D.C. ±1%, while the precision resistor 104 is used for fixing the current at about 0.5 ma. through the cell. Because of manufacturers' tolerances, the precision resistor 104 and the voltage regulator 102 may have to be matched to within ±1% in order to obtain the desired results.

Circuit performance may be appraised by tracing the direction for fixing the voltage regulator 102 operating point from the positive supply terminal 106 (in FIG. 1, lead 70) through the composition resistor 100, the voltage regulator 102 and back to the negative terminal 108 (in FIG. 1, lead 68), and by tracing the direction for fixing the cell current (0.51 ma.) from the positive terminal 110 of the voltage regulator 102 through the precision resistor 104, the cell C and back to the negative terminal 112 of the voltage regulator 102. While variation in supply voltage (approximately ±14%) will result in proportional variation in current through the voltage regulator 102, the low dynamic impedance of the voltage regulator results in less than ±1% variation in regulated voltage across the cell unit C.

A modified version of the D.C. supply circuit is shown in FIG. 10 wherein the composition resistor 100 shown in FIG. 6 is replaced with a miniature tungsten lamp 114 having a positive voltage resistance characteristic. This configuration provides lighting means which will give a quick visual indication of the fact that the time indicator is in operation and will provide illumination for the reading tube as well.

FIG. 6 shows means for operating the indicator with a source of 105–125 v. A.C. The circuit comprises a 1 watt ±5% 30K ohm composition resistor 120 combined with a silicon diode rectifier 122, a 50–60 v. voltage regulator neon lamp 124 and a ¼ watt 45K ohm deposited carbon resistor 126. The composition resistor 120 is used to bias a voltage regulating device 124 of the gas discharge type, such as a neon lamp, while the rectifier 122 is used, of course, to convert A.C. to D.C. supply. This configuration is not shown in FIG. 1 but it will be obvious as to how it may be placed within cavity 26 in a similar manner.

Suitable components, such as Signalite RT2–32–1A neon lamp, and a Hoffman HB–6 (270 P.I.V.) rectifier may be used for elements 124 and 122 respectively. Of course other suitable types of gas discharge, voltage regulating devices may be used if desired. Because of the manufacturers' production tolerances, the deposited carbon resistor may have to be matched within ±1% with the neon lamp gas discharge device 124 to determine the proper value of the constant current fed to the cell.

The circuit is traced for fixing the operating point of the neon lamp 124 from one side of the supply 128 through the composition resistor 120, the silicon diode 122, the lamp 124, and back to the other side of the 130 of the supply. The tracing direction for fixing the cell current is from one terminal of neon lamp 124 through the precision resistor 126, the cell C and back to the other terminal of the lamp.

As in the D.C. supplied circuit variation of supply voltage (here ±8.7%) results in proportional current variations through the neon lamp. However, the voltage variation across the lamp is reduced to within ±2% due to the neon lamp characteristics.

Figure 11:
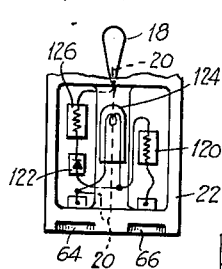
FIG. 11 is a partial rear elevational view partially broken away of the device of the present invention showing the placement of the power supply depicted in FIG. 6.
Figure 5:
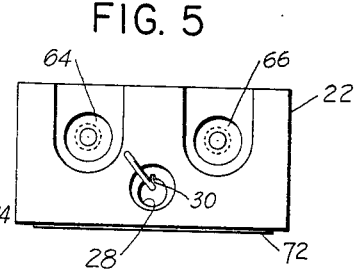
FIG. 5 is a bottom view of the device taken along lines 5—5 of FIG. 3.
Figure 4:
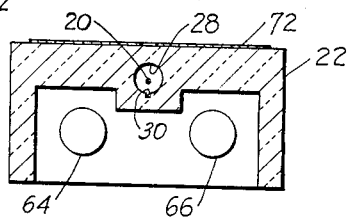
FIG. 4 is a cross sectional view of the device taken along lines 4—4 of FIG. 3.

An interesting advantage of this circuit configuration is that the neon lamp 124 may itself be used for a visual indication that the device is recording since it will naturally glow when in operation. It will also illuminate the reading tube. As shown in FIG. 11, neon lamp gas discharge device 124 is positioned in cavity 26 adjacent to slot 78. The device 124 is positioned in such a manner that the glow light therefrom passes through slot 78, and illuminates the portion of reading tube 28 not yet filled with mercury thus facilitating the observance of the height of the mercury column therien. The glow light will also serve to eliminate calibrated indicia 74 of nameplate 72. It will be noted that gas discharge device 124 performs the double function of a voltage regulating device and an illuminating device for the elapsed time indicating device of the present invention. By inclusion of resistor 140 and capacitor 142 network (shown in phantom in FIG. 6), we may be able to achieve superior regulation of the cell circuit constant current, although its cost is slightly higher.

Means quite similar to those employed in the D.C. supplied circuit shown in FIG. 9 may be also employed as an A.C. supply circuit. Reference is made to FIG. 7 where this is shown. In this circuit a single anode zener diode 102 is used as a voltage regulator, biased by a composition resistor having a value of 2 watts+10K ohms. The voltage on the cell is controlled by a 1 watt 5K ohm precision resistor, having a positive temperature coefficient functioning somewhat in the same manner as previously stated in connection with the description of the operation of the circuit of FIG. 9.

However, to completely regulate the average value of a clipped and clamped A.C. wave, it is necessary to compensate for the temperature coefficient of the forward biased diode portion of element 102 as well as the temperature coefficient of the well-known reversed biased zener effect portion of element 102. The positive temperature coefficient of the zener portion tends to increase the amplitude of the zener clipped wave with an increase in temperature. The negative temperature coefficient of the forward biased diode tends to reduce the negative value of the clamped portion of the wave with an increase in temperature. Therefore, to adequately compensate the average value of the output wave with temperature, it is necessary to use a positive temperature coefficient resistor of greater magnitude than would normally be expected, to compensate for both effects since they are additive. The operation of this circuit is to selectively regulate and apply half of the supply sinusoid to the cell circuit and to bypass the other half of the sinusoid, resulting in a pulsating direct current to the cell circuit.

A modified version of the A.C. supply circuit shown in FIG. 6 is shown in FIG. 8. In this modification, the relative positions of the silicon rectifier 122 and the neon tube 124 are exchanged. By placing the rectifier 122 after the neon tube 124, a somewhat better degree of reliability and more light can be obtained since the rectifier requires a lower peak inverse voltage capability which limits the possible line voltage excursion from ±14% to ±10%, thereby permitting greater accuracy of voltage held by the zener diode.

It is quite obvious that the electronic circuitry shown for either a D.C. supply or A.C. supply can be modified further without change in its basic configuration, to accommodate differences in timing requirements, cell resistance, cell operating current, or even supply voltage which may be dictated by changes or modifications which are made in the structure of the cell, its electrolytic elements and in the use to which it is put. Such modifications may require different operating characteristics for the resistors or regulators but will not change the configuration of the circuit.

It will thus be seen that the objects set forth above, and those made apparent from the preceding description, are efficiently attained. As various changes may be made in form, construction and arrangement of the parts herein without departing from the spirit and scope of the invention and without sacrificing any of its advantages, it is to be understood that all matter herein is to be interpreted as illustrative and not in a limiting sense.

We claim:

1. A temperature compensated voltage converter for converting A.C. to pulsating D.C. voltage of constant amplitude comprisings, a pair of A.C. input terminals for receiving an A.C. voltage to be converted to D.C., a zener diode and a biasing resistor for said diode connected in series across said terminals, said zener diode being adapted to limit the positive and negative half cycles of an A.C. voltage applied to said terminals to a predetermined amplitude, a load impedance and a current limiting resistor for said load impedance connected in series therewith, said current limiting resistor and said load impedance being connected in shunt across said zener diode, said current limiting resistor having a temperature coefficient of resistance of a value corresponding to both the temperature coefficient of said zener diode when operating in a forward direction and the temperature coefficient of said zener diode when operating in the zener direction.

2. A temperature compensated voltage converter for converting A.C. to pulsating D.C. voltage of constant amplitude comprising, a pair of A.C. input terminals for receiving an A.C. voltage to be converted to D.C., a zener diode and a biasing resistor for said diode connected in series across said terminals, said zener diode being adapted to limit the positive and negative half cycles for an A.C. voltage applied to said terminals to a predetermined amplitude, a load impedance and a current limiting resistor for said load impedance connected in series therewith, said current limiting resistor and said load impedance being connected in shunt across said zener diode, said current limiting resistor having a positive temperature coefficient of resistance of a value sufficient to compensate for the additive operating effect of both the negative temperature coefficient of said zener diode when operating in a forward direction and the positive temperature coefficient of said zener diode when operating in the zener direction.

References Cited by the Examiner

UNITED STATES PATENTS

| | | |
|---|---|---|
| 2,819,442 | 1/58 | Goodrich. |
| 2,829,282 | 4/58 | Hughes et al. _____ 307—88.5 |
| 2,984,780 | 5/61 | Koletsky _____ 323—99.5 |
| 2,989,683 | 6/61 | Hessinger et al. _____ 321—16 |
| 3,070,744 | 12/62 | Upton. |

LLOYD McCOLLUM, *Primary Examiner.*

SAMUEL BERNSTEIN, *Examiner.*